United States Patent
Hosoda et al.

(10) Patent No.: US 10,257,388 B2
(45) Date of Patent: Apr. 9, 2019

(54) IMAGE FORMING APPARATUS, CONTROL METHOD FOR IMAGE FORMING APPARATUS, AND STORAGE MEDIUM FOR SETTING USER AUTHENTICATION

(71) Applicant: CANON KABUSHIKI KAISHA, Tokyo (JP)

(72) Inventors: Yasuhiro Hosoda, Abiko (JP); Masaaki Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/832,404

(22) Filed: Aug. 21, 2015

(65) Prior Publication Data

US 2016/0065788 A1 Mar. 3, 2016

(30) Foreign Application Priority Data

Aug. 26, 2014 (JP) .................. 2014-171161

(51) Int. Cl.
*G06F 3/12* (2006.01)
*H04N 1/44* (2006.01)
*H04N 1/00* (2006.01)

(52) U.S. Cl.
CPC ....... *H04N 1/4433* (2013.01); *H04N 1/00413* (2013.01); *H04N 1/00416* (2013.01); *H04N 1/00419* (2013.01); *H04N 1/00464* (2013.01); *H04N 1/00474* (2013.01); *H04N 1/00938* (2013.01); *H04N 1/00941* (2013.01); *H04N 2201/0094* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,636,903 B2* | 10/2003 | Endoh | ................... | G06F 3/1204 358/1.1 |
| 2005/0183141 A1* | 8/2005 | Sawada | .................. | G03G 21/04 726/16 |
| 2010/0302582 A1* | 12/2010 | Yoshimura | ........... | H04N 1/4406 358/1.15 |
| 2011/0134456 A1* | 6/2011 | Tsujimoto | .......... | H04N 1/00204 358/1.13 |
| 2012/0144329 A1* | 6/2012 | Sasaki | ................... | G06F 3/0482 715/764 |
| 2012/0260350 A1* | 10/2012 | Yamada | ............. | H04N 1/00411 726/28 |
| 2013/0250342 A1* | 9/2013 | Kaku | ................. | H04N 1/00408 358/1.14 |

(Continued)

FOREIGN PATENT DOCUMENTS

JP 2011-37161 A 2/2011

*Primary Examiner* — Henok Shiferaw
(74) *Attorney, Agent, or Firm* — Canon U.S.A., Inc. IP Division

(57) ABSTRACT

An image forming apparatus includes an installation unit configured to install an application, a setting unit configured to perform setting of whether user authentication is to be executed for each of a plurality of applications including the application installed by the installation unit, and a determination unit configured to determine whether user authentication is to be executed based on the setting performed by the setting unit when an application is selected from among the plurality of applications.

4 Claims, 14 Drawing Sheets

(56) References Cited

U.S. PATENT DOCUMENTS

2013/0347097 A1* 12/2013 Pan .................. G06F 21/31
                                          726/17
2015/0172504 A1*  6/2015 Sato ............... H04N 1/32026
                                          358/1.13

* cited by examiner

FIG.4

INSTALL ADDITIONAL APPLICATION

| ENTER FILE PATH | INSTALL |

MANAGE INSTALLED APPLICATION

| UNINSTALL | START | STOP |

| APPLICATION NAME | STATUS |
| --- | --- |
| ☐ My Documents | STARTING |
| ☐ Work Flow | STARTING |

FIG.5

501 MENU
- 502 SET USER AUTHENTICATION
- 503 MANAGE ACCOUNT

503 MANAGE ACCOUNT

504 [REGISTER] [EDIT] [DELETE]

| USER NAME | USER TYPE |
|---|---|
| Alice | MANAGER |
| Bob | GENERAL USER |
| Carol | GENERAL USER |

502 SET USER AUTHENTICATION

USER AUTHENTICATION FUNCTION ON/OFF
- ○ OFF  ● ON

SELECT BUTTON CAUSING USER AUTHENTICATION
- ☐ COPY
- ☑ FAX
- ☑ SEND MAIL
- ☑ WEB BROWSER
- ☐ aaa.jp
- ☐ Company
- ☑ MY DOCUMENTS
- ☐ WORKFLOW

[UPDATE] [CANCEL]

504 REGISTER ACCOUNT

- USER NAME: Alice
- PASSWORD: ****
- MAIL ADDRESS: ****
- USER TYPE: ○ MANAGER  ● GENERAL USER AUTHORITY TO USE BUTTON
- COPY        ● PERMIT ○ INHIBIT
- FAX         ○ PERMIT ● INHIBIT
- SEND MAIL   ● PERMIT ○ INHIBIT
- WEB BROWSER ● PERMIT ○ INHIBIT
- aaa.jp      ● PERMIT ○ INHIBIT
- Company     ● PERMIT ○ INHIBIT
- MY DOCUMENTS ● PERMIT ○ INHIBIT
- WORKFLOW    ● PERMIT ○ INHIBIT

[UPDATE] [CANCEL]

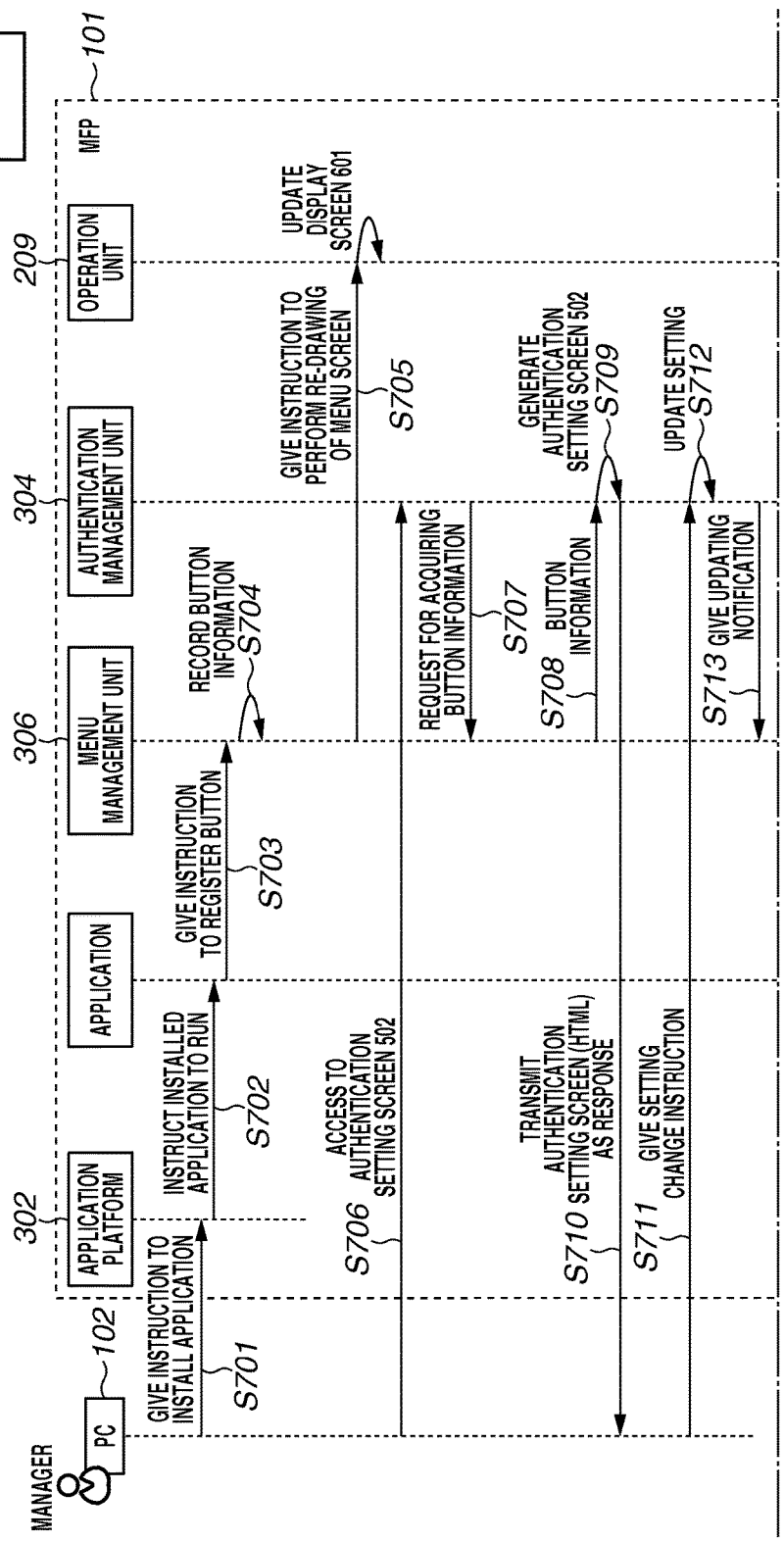

FIG.10

| Intents SERVICE | PROVIDED FUNCTION | CALLING MODULE | |
|---|---|---|---|
| Intents MADE BY xxx | DISPLAY PDF | http://local.pdfview | ~1201 |
| | PRINT PDF | http://local.pdfprint | ~1202 |
| | STORE PDF | http://local.pdfstore | ~1203 |
| Intents MADE BY yyy | SCAN AND SEND | http://yyy.scansend | |
| | PRINT PDF | http://yyy.pdfprint | |

FIG.11

| Intents SERVICE | PROVIDED SERVICE | AUTHENTICATION |
|---|---|---|
| Intents MADE BY xxx | PRINT PDF | NECESSARY |
| Intents MADE BY xxx | DISPLAY PDF | UNNECESSARY |

IMAGE FORMING APPARATUS, CONTROL METHOD FOR IMAGE FORMING APPARATUS, AND STORAGE MEDIUM FOR SETTING USER AUTHENTICATION

BACKGROUND OF THE INVENTION

Field of the Invention

The present invention relates to an image forming apparatus capable of executing user authentication when an application is selected.

Description of the Related Art

An image forming apparatuses is able to operate a plurality of applications such as a copy application, a transmission application, and a web-browser application. Such image forming apparatus is provided with a mechanism that, when an application is selectively used, executes user authentication in order to identify a user of the application and which of applications.

Japanese Patent Laid-Open No. 2011-37161 discusses a technique that displays a screen for causing a user to select an application, and that, when an application requiring user authentication is selected on the displayed screen, executes the user authentication. According to Japanese Patent Laid-Open No. 2011-37161, use of a designated application can be restricted to a particular user.

A recent image forming apparatus of some type is able to operate not only factory-default applications but also applications later additionally installed by using an installer or the like.

A manager of an image forming apparatus occasionally desires to limit a user to be authorized to only a particular user regarding use of an application additionally installed later as described above. However, it is impossible for the image forming apparatus of the related art to set whether to execute user authentication for additionally installed applications in a method similar to that for default applications.

SUMMARY OF THE INVENTION

The present invention provides an image forming apparatus capable of, when an installed application is used, appropriately setting user authentication.

According to an aspect of the present invention, an image forming apparatus includes an installation unit configured to install an application, a setting unit configured to perform setting of whether user authentication is to be executed for each of a plurality of applications including the application installed by the installation unit, and a determination unit configured to determine whether user authentication is to be executed based on the setting performed by the setting unit when an application is selected from among the plurality of applications.

Further features of the present invention will become apparent from the following description of exemplary embodiments with reference to the attached drawings.

BRIEF DESCRIPTION OF THE DRAWINGS

FIG. 4 is a diagram illustrating a user interface provided by an application management service.

FIG. 5 is a diagram illustrating a user interface provided by an authentication setting service.

FIG. 10 illustrates one example of a table with application information registered thereon.

FIG. 11 illustrates one example of a table managing whether to execute authentication by function provided by an Intents service.

DESCRIPTION OF THE EMBODIMENTS

Exemplary embodiments of the present invention will be described below with reference to the accompanying drawings. The present exemplary embodiments illustrate a multifunction peripheral (MFP) 101 as one example of an image forming apparatus.

A first exemplary embodiment of the present invention will be described below.

<System Configuration>

Figure 1:
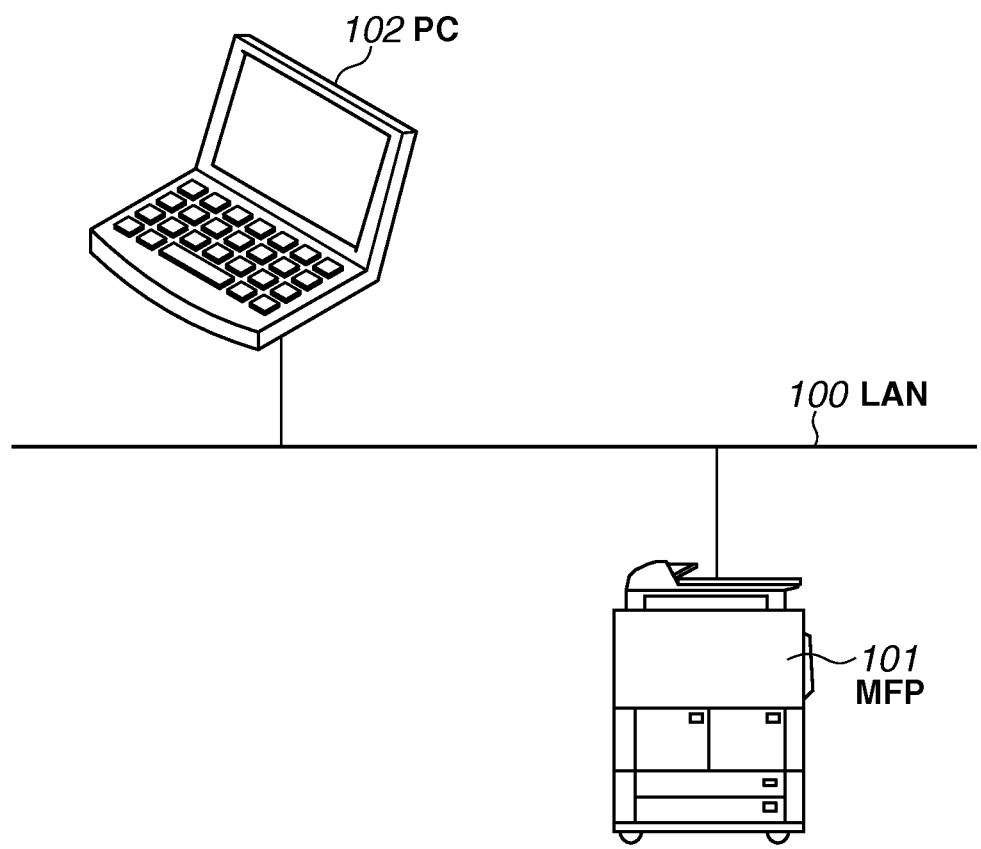
FIG. 1 is a schematic diagram illustrating a system configuration.

FIG. 1 is a schematic diagram illustrating a system configuration of the first exemplary embodiment. The MFP 101 as one example of the image forming apparatus is connected to a local area network (LAN) 100. The MFP 101 and other terminals connected to the LAN 100 communicate with one another. For example, a manager who manages the MFP 101 can access and alter settings of the MFP 101 from a personal computer (PC) 102 for the manager via the LAN 100.

In the MFP 101 according to the first exemplary embodiment, an application can be installed under the instructions of the manger who uses the PC 102. Information on the installed application is displayed on a menu screen displayed by an operation unit of the MFP 101. The MFP 101 becomes able to execute functions provided by the application in accordance with a user's operation via the menu screen.

<Hardware Configuration>

Figure 2:
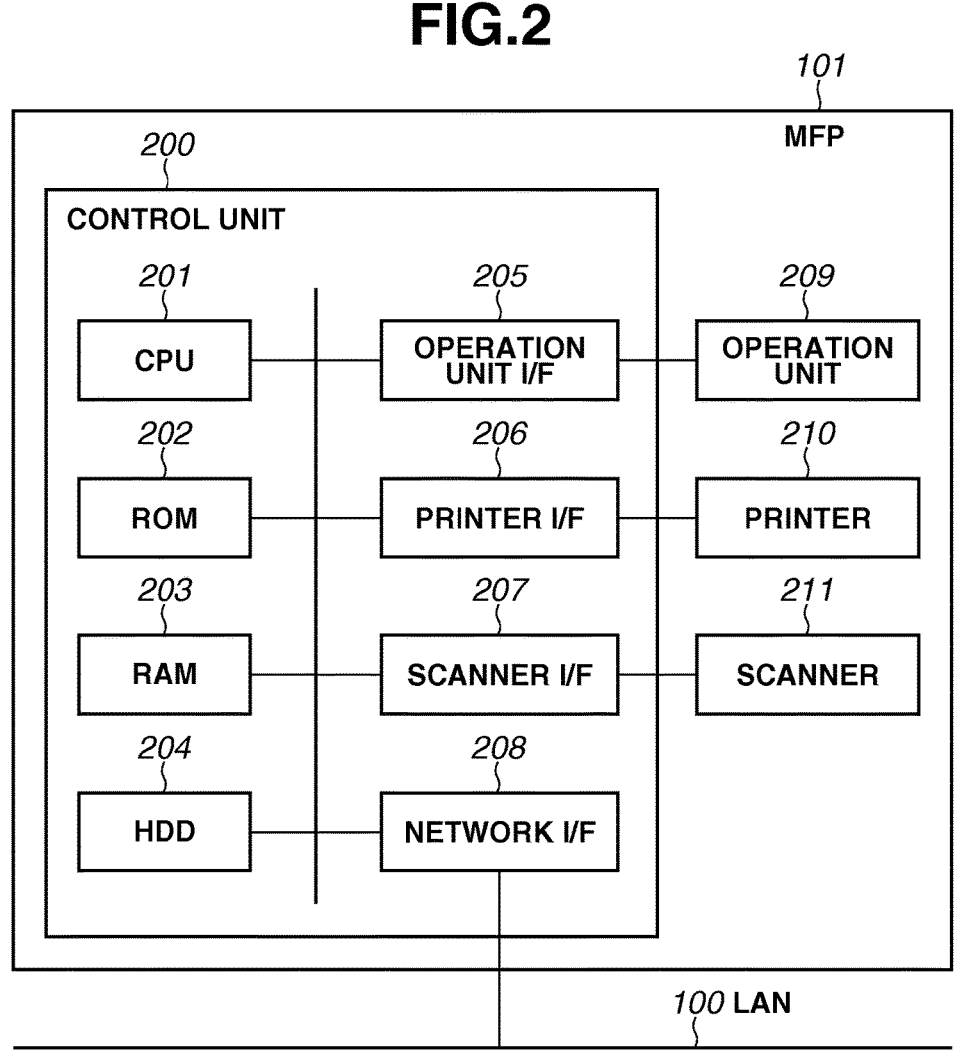
FIG. 2 is a block diagram illustrating a hardware configuration of an image forming apparatus.

FIG. 2 is a block diagram illustrating a configuration of the MFP 101. The MFP 101 includes a control unit 200 that controls an operation of the MFP 101, an operation unit 209 for receiving a user's operation, a printer 210 for executing a print process, and a scanner 211 for executing a reading process.

The control unit 200 includes a central processing unit (CPU) 201, a read-only memory (ROM) 202, a random access memory (RAM) 203, a hard disk drive (HDD) 204, an operation unit interface (I/F) 205, a printer I/F 206, a scanner I/F 207, and a network I/F 208. The CPU 201 is an arithmetic unit that controls the MFP 101. The CPU 201 reads a control program stored in the ROM 202, and performs various types of control. The RAM 203 is a volatile storage device that is used as a main memory for the CPU 201. The RAM 203 is also used as a temporary storage area such as a work area.

The HDD 204 is a non-volatile storage device that stores image data and various programs. The operation unit I/F 205 is an interface for connecting the operation unit 209 and the control unit 200 to each other. The operation unit 209 is provided with a display that operates as a touch panel.

The printer I/F 206 connects the printer 210 and the control unit 200 to each other. Image data to be printed by the printer 210 is transferred from the control unit 200 via the printer I/F 206, and is printed on a recording medium by the printer 210.

The scanner I/F 207 connects the scanner 211 and the control unit 200 to each other. The scanner 211 reads an image on a document to generate image data, and inputs the image data to the control unit 200 via the scanner I/F 207.

The network I/F 208 is an interface that connects the MFP 101 to the LAN 100. The network I/F 208 includes functions of transmitting image data or other information to the PC 102 or other network devices on the LAN 100, and receiving image data or other information from the network devices or the like on the LAN 100.

<Software Configuration of MFP 101>

Figure 3:
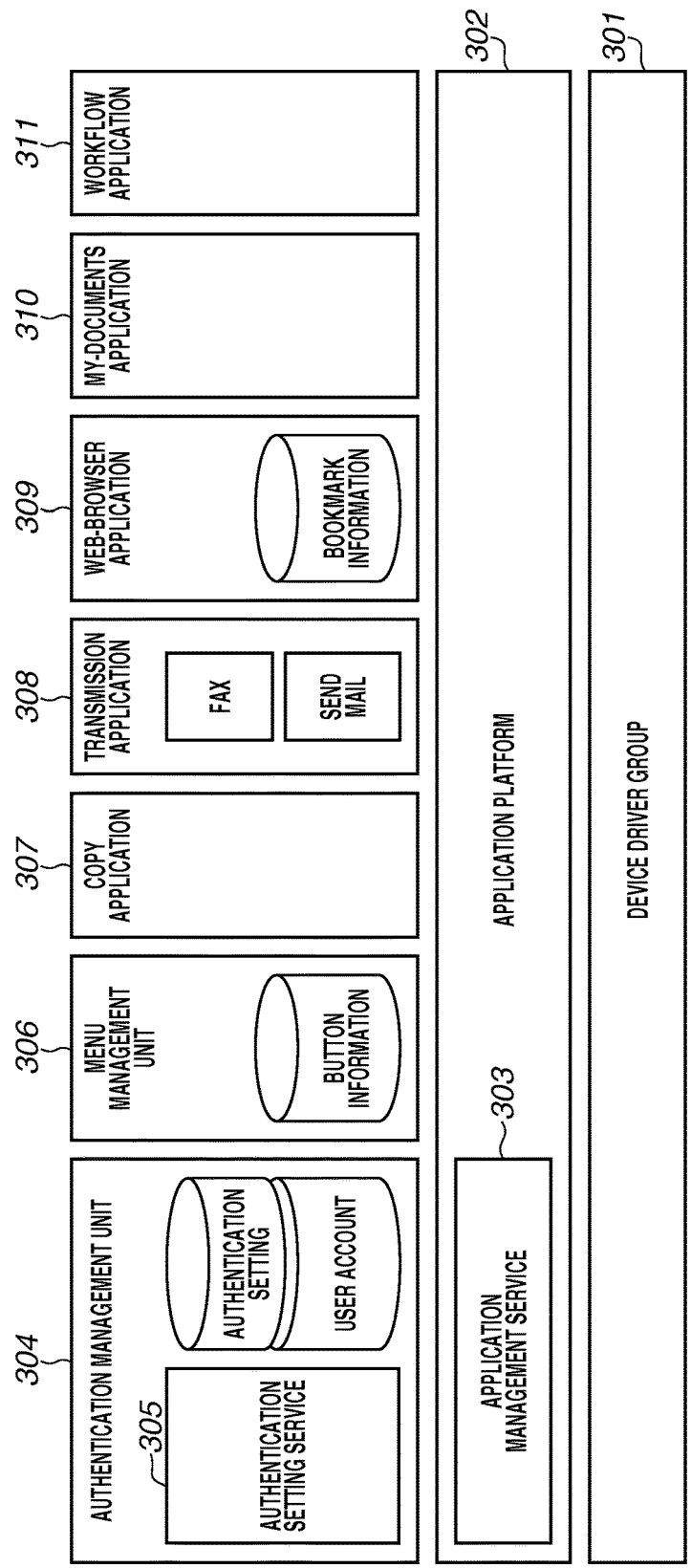
FIG. 3 is a block diagram illustrating a software configuration of the image forming apparatus.

FIG. 3 is a block diagram illustrating a software configuration of the MFP 101. Software indicated in each block illustrated in FIG. 3 is stored in the ROM 202 or the HDD 204 of the MFP 101. The software is executed by the CPU 201 of the MFP 101 to realize functions, which will be described below.

<Device Driver>

A device driver group 301 is a group of device drivers for controlling the pieces of the hardware illustrated in FIG. 2.

<Application Platform 302>

An application platform 302 provides functions of installing applications in the MFP 101, and starting or stopping installed applications. The application platform 302 is configured to include an operating system such as Linux®, a virtual machine such as JAVA®, and the Open Service Gateway Initiative (OSGi) framework. The OSGi framework is a JAVA® based service platform defined by the OSGi Alliance (standards association). The application platform 302 includes an application management service 303. The application management service 303 is an installer for installing and uninstalling applications. The application management service 303 operates as a web server accessible in the Hypertext Transfer Protocol (HTTP) by the PC 102. One example of an application management screen provided by the application management service 303 is illustrated in FIG. 4.

The application management screen illustrated in FIG. 4 is a screen provided as a web page by the application management service 303 of the MFP 101. The screen is displayed on the display of the PC 102. The application management screen provides functions of installing an additional application, and starting and stopping an installed application. The additional application includes a manifest file describing application information and attributes. In general, a MANIFEST.MF file defined in the OSGi, etc., are known. The application management screen displays an application name acquired from a manifest file of an additionally installed application.

<Authentication Management Unit 304>

An authentication management unit 304 includes an authentication setting service 305 that provides a user authentication function. The authentication management unit 304 provides registering an account of a user who is to be allowed to use the MFP 101. The authentication management unit 304 further provides setting whether to request each application of the MFP 101 to execute user authentication.

The authentication setting service 305 operates as a web server accessible in the HTTP by the PC 102 for the manager. One example of an authentication setting screen provided by the authentication setting service 305 is illustrated in FIG. 5.

FIG. 5 illustrates a setting screen provided as a web page by the authentication management unit 304. The setting screen is displayed on the display of the PC 102. FIG. 5 illustrates a menu 501 that displays a link to a page for SET USER AUTHENTICATION 502 and a link to a page for MANAGE ACCOUNT 503.

The page for the SET USER AUTHENTICATION 502 provides a graphical user interface (GUI) for switching on and off a user authentication function and for setting whether to require user authentication for each application. The page for the SET USER AUTHENTICATION 502 displays a list of button information including icons and button names for identifying applications. The applications include also an application later installed in the MFP 101. In other words, default applications and custom applications are displayed on a single setting screen.

Figure 6:
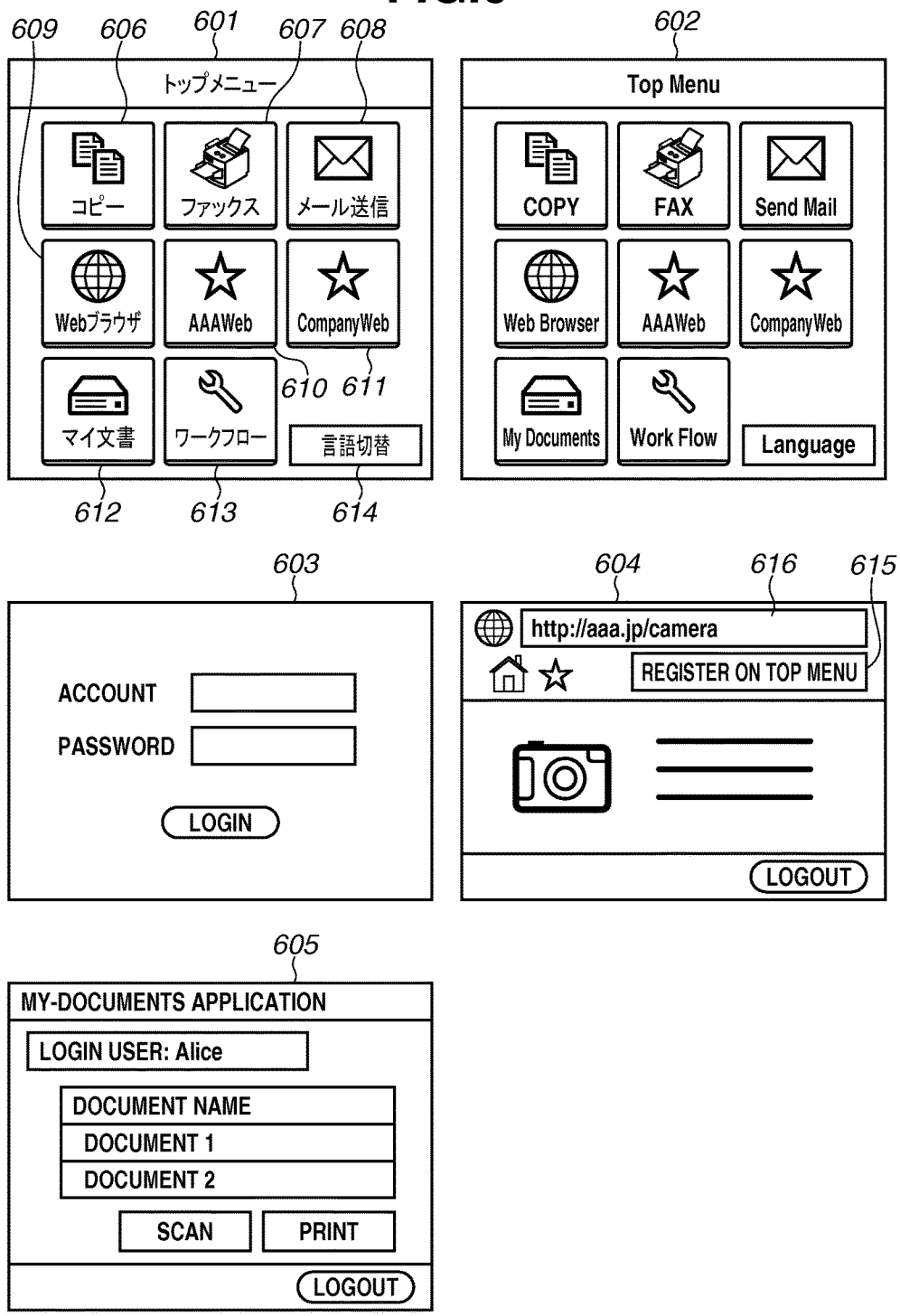
FIG. 6 is a diagram illustrating a user interface displayed on an operation unit of the image forming apparatus.

The icons displayed as a list on the page for the SET USER AUTHENTICATION 502 are identical to icons displayed on a menu screen 601 illustrated in FIG. 6. The button names displayed as a list on the page for the SET USER AUTHENTICATION 502 are also identical to button names displayed on the menu screen 601. In the page for the SET USER AUTHENTICATION 502, by checking on the left side of the icons displayed as a list, the manager requires an application corresponding to the checked icon to execute user authentication when the application is to be used. This setting operation can require user authentication to be executed when one button is selected on the menu screen 601 illustrated in FIG. 6. The icons displayed as a list on the page for the SET USER AUTHENTICATION 502 include button information acquired from the applications.

The page for the MANAGE ACCOUNT 503 displays a list of accounts of users who use the MFP 101, which is managed by the authentication setting service 305, and provides a "REGISTER" button, an "EDIT" button, and a "DELETE" button respectively for registering, editing, and deleting an account. Detection of a touch on the EDIT button causes the page to transition to a page for REGISTER ACCOUNT 504. The page for the REGISTER ACCOUNT 504 provides a function to register a new account by receiving inputs of a user name, a password, a mail address, a user type, and an authority in a case of using the MFP 101 that are necessary to identify an individual. Information of the account registered by the authentication management unit 304 is stored in the HDD 204.

The authentication management unit 304 can set, in units of users, use authorities of applications corresponding to the buttons displayed on the menu screen 601 illustrated in FIG. 6. For example, as illustrated in FIG. 5, it is assumed that, for the user name "Alice", use of a FAX application is set to be inhibited. Even if a user corresponding to the user name "Alice" has touched the FAX button on the menu screen 601, the user is unable to login the FAX application. The authentication setting service 305 further includes the following functions.

The authentication setting service 305 causes the operation unit 209 to display a user interface for user authentication (i.e., a user authentication screen) 603 illustrated in FIG. 6, and requests a user who uses the operation unit 209 to enter authentication information.

The authentication setting service 305 generates and stores, in the RAM 203, an object entitled "login context"

representing user information. The login context stored in the RAM 203 is configured so as to be also referred to by other software modules (the applications, the menu management unit 306, and the application platform 302) via an application programming interface (API). In a state that before user authentication is executed after the authentication setting service 305 starts the MFP 101, the authentication setting service 305 generates a login context indicating that the user who is using the operation unit 209 is an unspecified user. One example of information retained by the login context before user authentication is illustrated in Table 1 below.

TABLE 1

| Item | Value |
|---|---|
| User name | |
| Mail Address | |
| User type | Guest |
| List Of Identifiers Of Buttons That Inhibit Use Of Unspecified User | 607, 608, 609, 612 |

In the login context illustrated in Table 1, the user name and the mail address are set to be blank since both are unknown before user authentication even after the MFP 101 starts. The user type is represented by a guest. After user authentication has made, login context of an authenticated user is generated. One example of information retained by the login context after user authentication is illustrated in Table 2 below.

TABLE 2

| Item | Value |
|---|---|
| User Name | Bob |
| Mail Address | bob@aaa.jp |
| User Type | general user |
| List Of Identifiers Of Buttons That Inhibit Use Of Unspecified User | 607 |

<Menu Management Unit 306>

A menu management unit 306 includes an API for causing the operation unit 209 to display the menu screen 601 illustrated in FIG. 6 and for acquiring button information to be displayed on the menu screen 601. One example of the button information received by the API is illustrated in Table 3. The button information includes an application ID of an application that has called the API, character strings for display in units of languages (e.g., Japanese or English), and image data of the icon.

TABLE 3

| Application ID | Character String for Display | | Icon |
|---|---|---|---|
| | Japanese | English | |
| 307 | コピー | COPY | |

TABLE 4

| Application Identifier | Button Identifier | Icon Name | | Icon |
|---|---|---|---|---|
| | | Japanese | English | |
| 307 | 606 | コピー | COPY | |
| 308 | 607 | ファックス | FAX | |
| 308 | 608 | メール送信 | Send Mail | |
| 309 | 609 | ウェブブラウザ | Web Browser | |
| 309 | 610 | AAAWeb | AAAWeb | |
| 309 | 611 | CompanyWeb | CompanyWeb | |
| 310 | 612 | マイ文書 | My Documents | |
| 311 | 613 | ワークフロー | Work Flow | |

The button identifiers are IDs for uniquely identifying buttons displayed on the menu screen. The menu management unit 306 manages the button identifiers so as to differ from other buttons. The button identifiers may respectively be designated by the applications, and may be issued by the menu management unit 306. In a case where the menu management unit 306 issues a button identifier to an application, the menu management unit 306 notifies the application of the issued button identifier.

The menu screen 601 includes a button 614 illustrated in FIG. 6 for switching between display languages, and a function that, on detecting a touch on the button 614, switches the present display language to another display language.

<Application>

A copy application 307, a transmission application 308, a web-browser application (web browser) 309, a my-documents application 310, and a workflow application 311 are examples of applications that operate on the MFP 101. The copy application 307, the transmission application 308, and the web-browser application 309 are illustrated as examples of factory-default applications installed in the MFP 101. In the first exemplary embodiment, the default applications cannot be uninstalled by the application management service 303, and their starting operation cannot stop by the application management service 303.

The my-documents application 310 and the workflow application 311 are illustrated as examples of additional applications (custom applications) installed by the application management service 303.

Each application includes an identifier for uniquely identifying the application. Although a universally unique identifier (UUID) is normally used as an application identifier, for simplifying the description, the application identifier is represented by a three-digit figure.

Each application can register a plurality of buttons in the menu management unit 306. For example, the transmission application 308 registers a FAX button and a SEND MAIL button on a menu screen. In the menu screen 601, a touch on the FAX button or the SEND MAIL button causes the transmission application 308 to display a screen corresponding to the touched button.

A screen 604 illustrated in FIG. 6 is an example of a screen that is displayed on the operation unit 209 and that is provided by the web-browser application 309. The web-browser application 309 includes a function that, on detecting a touch on a bookmark registering button 615, registers a universal resource locater (URL) of a web site being displayed, as a bookmark button, in the menu. When in the menu screen 601, a bookmark button 610 or 611 is selected the screen 604 of the web browser is invoked. The web browser hides a URL entering field of the screen 616 so that the user cannot move to another web site by directly designating another URL.

The MY-DOCUMENTS APPLICATION screen 605 is an example of a screen provided by the my-documents application 310. The my-documents application 310 provides a function of storing a scanned document by establishing association with a currently logged-in user and controlling an image processing unit such as the scanner 211. The my-documents application 310 further provides a function of printing the scanned document by controlling the printer 210.

Figure 7B:
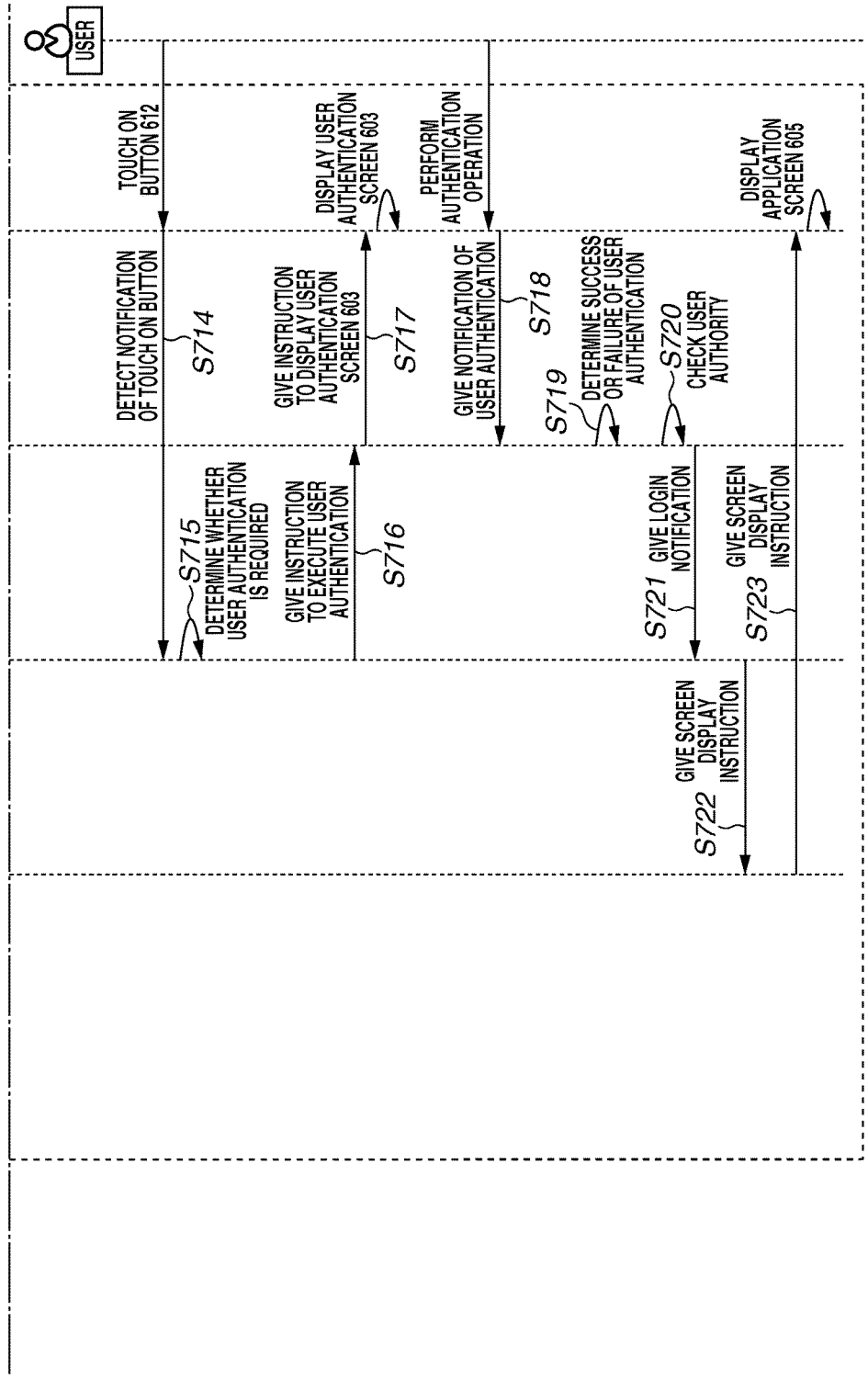
FIG. 7, composed of FIGS. 7A and 7B, is a sequence chart illustrating an operation of the image forming apparatus.

Now, an operation of the MFP 101 will be described below with reference to the sequence chart of FIGS. 7A and 7B. Unless otherwise particularly mentioned, a subject that executes the operation is the CPU 201. Data is exchanged between pieces of software via various types of APIs implemented by the software.

<Operation Flow when Installing Additional Application>

In step S701, when detecting an instruction to install an application via the application management screen, the application platform 302 executes installation of the application. In a case where the installation is successful, in step S702, the application platform 302 instructs the installed application to run. After the application runs, in step S703, the application instructs the menu management unit 306 to register one or more buttons. In step S704, the application notifies the menu management unit 306 of button information (an icon and a button name). Further in step S704, when receiving an instruction to record the one or more buttons, the menu management unit 306 stores the button information in the HDD 204. In step S705, the menu management unit 306 instructs the operation unit 209 to re-draw a menu screen including the new button or buttons.

Operation Flow when Registering Bookmark from Web Browser

By detecting that the user has touched a bookmark registering button 615 on the screen 604, the web-browser application 309 receives an instruction to register a bookmark on the menu screen 601. When receiving the instruction to register the bookmark, the web-browser application 309 records bookmark information including a URL, and instructs the menu management unit 306 to register the button. Steps from the instruction to register the button through displaying the button on the menu screen 601 are not illustrated since the steps are similar to steps S703 through S705.

<Operation Flow when Changing Authentication Setting>

In step S706, the authentication setting service 305 in the authentication management unit 304 detects access from the PC 102. Then, in steps S707 and S708, the authentication setting service 305 requests and acquires a list of button identifiers and pieces of button information (an icon and a button name) from the menu management unit 306. In step S709, the authentication setting service 305 generates the page for the SET USER AUTHENTICATION 502, which is described in hypertext markup language (HTML) by using the acquired button information. In step S710, the authentication setting service 305 transmits the generated page for the SET USER AUTHENTICATION 502 as a response in step S706 to the PC 102.

When, in step S711, receiving a setting change instruction via the page for the SET USER AUTHENTICATION screen, in step S712, the authentication setting service 305 updates the contents of the HDD 204 with new setting and the login text in the above-described Table 1 of the unspecified user as well. For example, an identifier of one button selected as a button causing user authentication on the page for the SET USER AUTHENTICATION 502 is stored in the login context as an identifier of a button that inhibits an unspecified user from using the button. In step S713, the authentication management unit 304 notifies the menu management unit 306 that the login context has been updated.

<Operation Flow when Button has been Touched on the Menu Screen>

Figure 8:
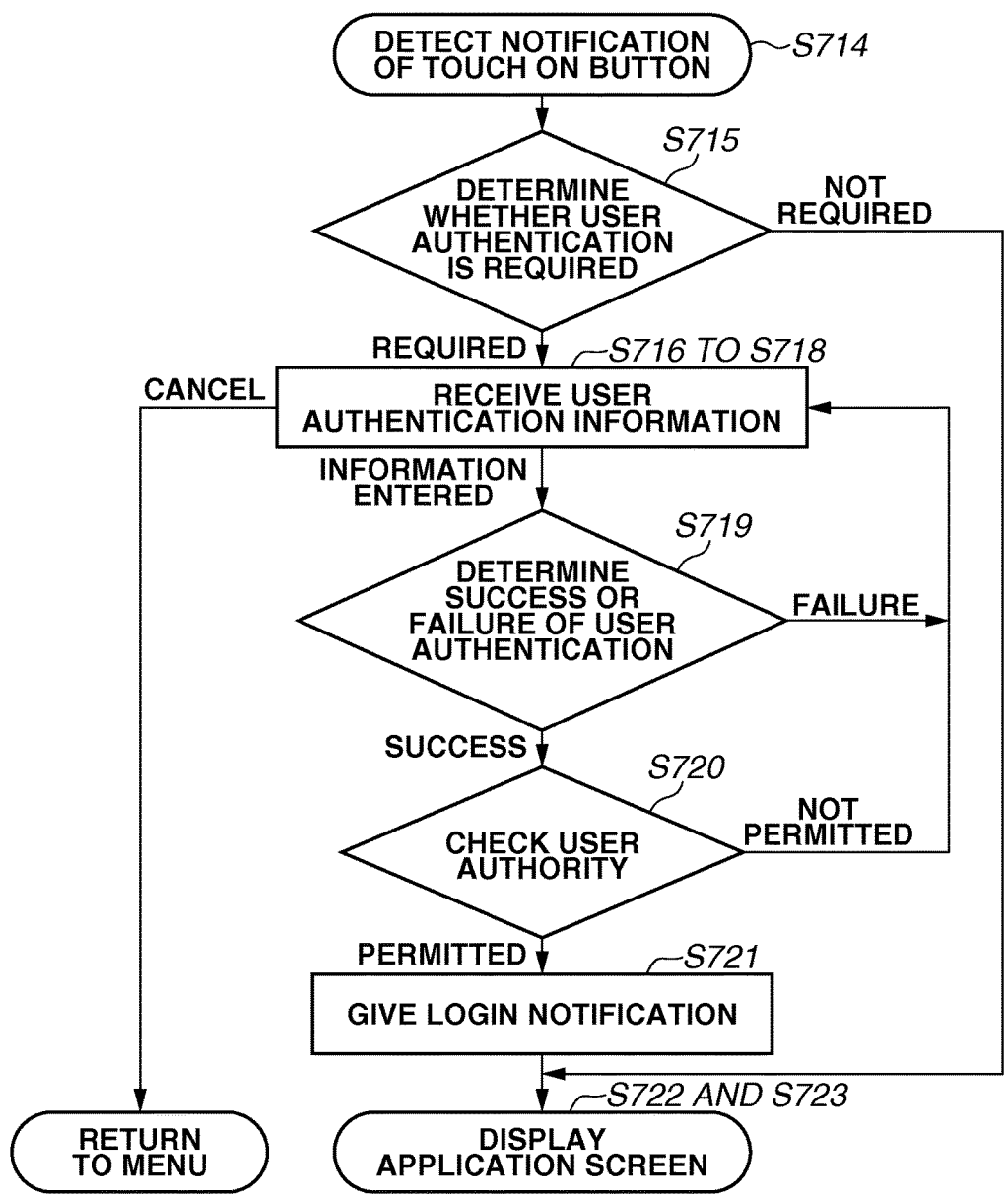
FIG. 8 is a flowchart illustrating an operation of the image forming apparatus.

FIG. 8 is a flowchart illustrating a process that is executed by the CPU 201 when a button has been touched on the menu screen displayed on the operation unit 209. A flow when a button on the menu screen has been touched will be described with reference to the sequence chart of FIG. 7B and the flowchart of FIG. 8. Steps common in FIGS. 7B and 8 are denoted by identical reference numerals.

In step S714, the menu management unit 306 detects that one button has been touched by the user via the menu screen. Then, in step S715, the menu management unit 306 determines whether user authentication is required. Specifically, in a case where a button identifier representing the touched button is stored in a list of identifiers of buttons, which inhibit use of the unspecified user, in the unspecified user's login context, it is determined that the user authentication is required. In a case where it is determined in step S715 that the user authentication is required (REQUIRED in step S715), in step S716, the menu management unit 306 instructs the authentication management unit 304 to execute the user authentication. When being instructed to execute the user authentication, in step S717, the authentication management unit 304 causes the operation unit 209 to draw the user authentication screen 603. In step S718, the authentication management unit 304 detects an authentication operation performed by the user. Then, in step S719, by comparing a user name and a password entered on the user authentication screen 603 with account information recorded in the HDD 204, the authentication management unit 304 determines success or failure of the user authentication. In a case where the user authentication is successful, the authentication management unit 304 generates login context of the authenticated user. In step S720, the authentication management unit 304 determines whether use of a function corresponding to the touched button in step S714 is permitted. In a case where a function corresponding to the touched button is permitted (PERMITTED in step S720), in step S721, the authentication management unit 304 notifies the menu management unit 306 that the user has logged in. When being notified that the user has logged in, in step S722, the menu management unit 306 notifies an application associated with the identifier of the touched button of a button identifier, and instructs the application to display a screen. When being instructed, in step S723, the application displays the screen which is associated with the button identifier.

In a case where the touched button is a button allowed to be used, the menu management unit 306 instructs the application to display a screen associated with the button identifier without instructing the authentication management unit 304 to execute the user authentication.

In a case where it is determined in step S715 that the user authentication is not required (NOT REQUIRED in step S715), the menu management unit 306 displays a screen of an application associated with the touched button without executing the user authentication. In a case where it is determined in step S719 that the user authentication is a failure, and in a case where it is determined in step S720 that the authenticated user has no authority to use the touched button, the CPU 201 prevents the present screen from being changed to a screen corresponding to the touched button. In other words, the user authentication screen 603 is displayed again on the operation unit 209 to receive entered authentication information again. In a case where, when the user authentication screen 603 is to be displayed, the authentication management unit 304 detects a touch on a CANCEL button, the authentication management unit 304 notifies the menu management unit 306 that the user authentication has been cancelled. The menu management unit 306 causes the operation unit 209 to display the menu screen 601 again.

As described above, in the first exemplary embodiment, button information is acquired from an additionally installed application, and it is set whether user authentication is required. This provides the advantages below.

As a first advantage, users who are allowed to use an additionally installed custom application can be limited.

As a second advantage, a button name for the menu screen displayed by the menu management unit 306 is displayed on the setting screen of determining whether the user authentication is required. Thus, even a manager who does not know an application name, the manager can set whether the user authentication is required for the button. Accordingly, in a case where a manager who installs an application differs from a manager who sets whether the user authentication is required, it is possible to properly set whether the user authentication is required.

As a third advantage, a setting of whether the user authentication is required is recorded in association with a button identifier. Thus, even in a case where a language for display in the image forming apparatus has been changed after the setting was performed, the setting before changing the language for display can be taken over.

As a fourth advantage, similarly to a bookmark of the web-browser application 309, it is possible to set whether authentication is required for an additional button later registered by an application.

As a fifth advantage, since the authentication management unit 304 manages requirement of the user authentication and user authorities, the menu management unit 306 may not manage them. Further, the authentication management unit 304 does not need to know relationships between applications and buttons since the authentication management unit 304 acquires button information from the menu management unit 306.

As a sixth advantage, setting of whether the user authentication is required for a custom application can be performed on the same setting screen for a default application.

A second exemplary embodiment of the present invention describes setting whether user authentication is required for a usable application by a web browser.

Figure 9:
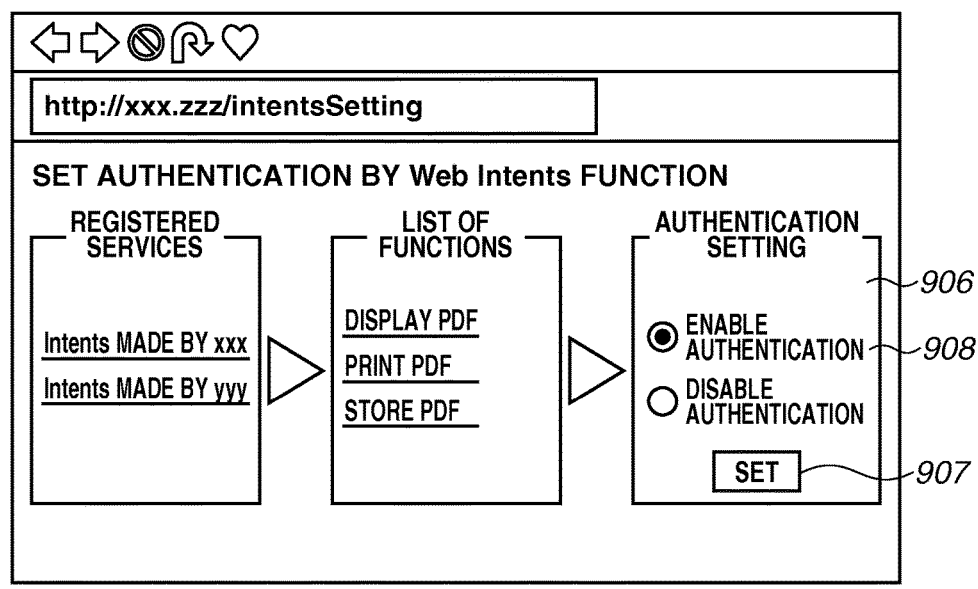
FIG. 9 is a diagram illustrating one example of a by-function authentication setting screen provided by the Intents.

FIG. 9 illustrates a setting screen for setting whether user authentication is required for an application. The Intents service indicated as an application on the left side of the setting screen of FIG. 9 may be an application installed in the image forming apparatus (MFP 101), or may be an application on an external web server. Information on an application to be used has been registered beforehand under an instruction of a manager.

Figure 12:
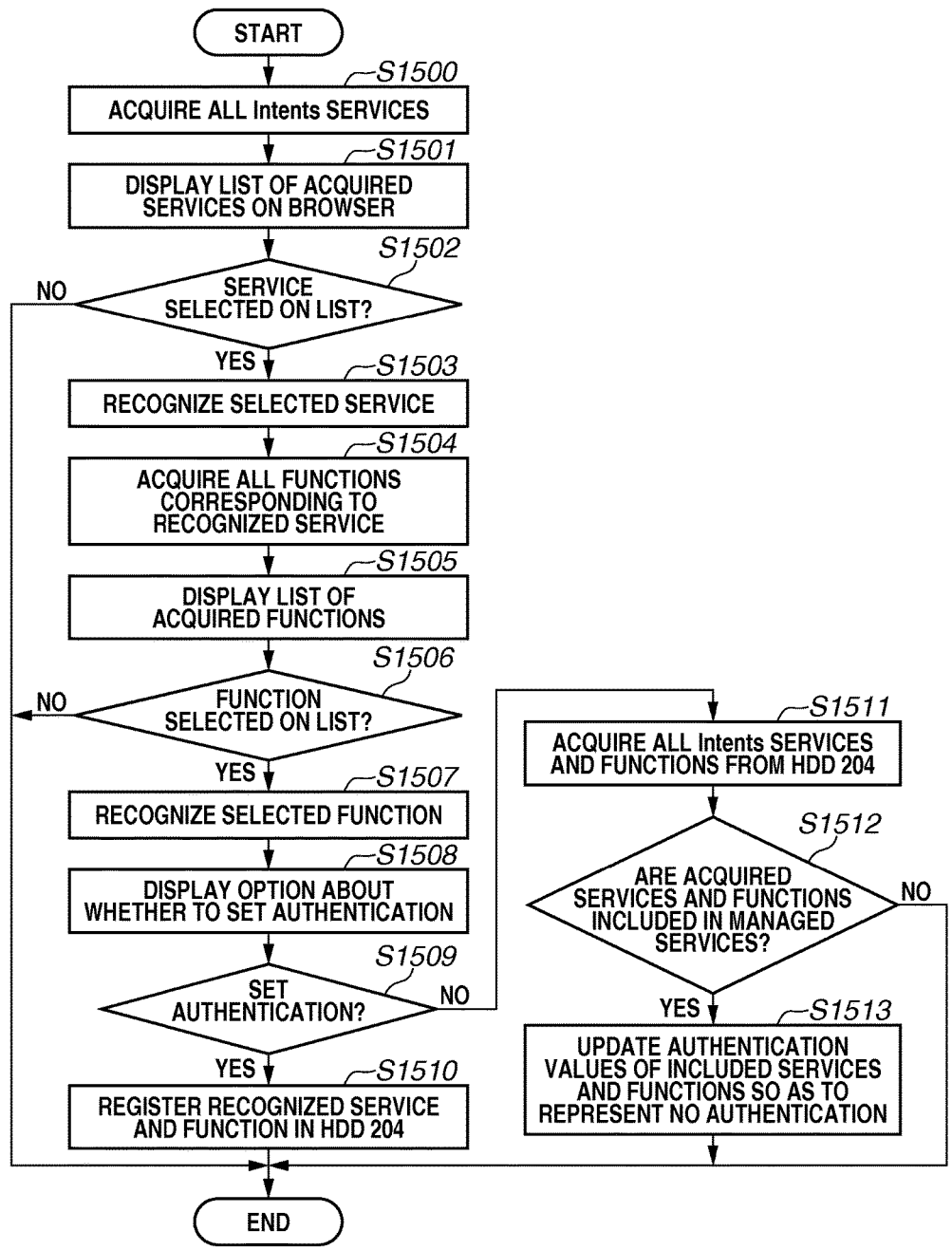
FIG. 12 is a flowchart illustrating a process of setting whether to execute user authentication for an Intents service.

FIGS. 10, 11, and 12 illustrate information on the application registered via the setting screen of FIG. 9. For example, when an instruction to register "Intents MADE BY xxx" is given, new records 1201, 1202, and 1203 illustrated in FIG. 10 are registered. Then, information on functions (a "PRINT PDF" function and a "DISPLAY PDF" function) provided by "Intents MADE BY xxx" is registered in a table illustrated in FIG. 11.

FIG. 12 is a flowchart illustrating a process of setting whether the user authentication is necessary for an application. Operations illustrated in the flowchart of FIG. 12 are realized by the CPU 201 executing the control program.

In step S1500, the CPU 201 acquires information on an application (an Intents service) from the HDD 204, and stores the information in the RAM 203. In step S1501, when receiving a request to perform a process of displaying a list of application information, the CPU 201 causes the operation unit 209 to display a screen as illustrated in FIG. 9. In step S1502, the CPU 201 receives a selection as an operation of a user (manager) on the displayed list. In a case where the CPU 201 receives the selection (Yes in step S1502), the process proceeds to step S1503. In a case where the CPU 201 receives no selection (No in step S1502), the process ends. In step S1503, the web-browser application 309 recognizes and stores the Intents service selected on the displayed list in the RAM 203. In step S1504, the CPU 201 acquires and stores all functions corresponding to the selected application in the RAM 203. In step S1505, when receiving a request to perform a process of displaying a list of all the acquired functions, the CPU 201 causes the operation unit 209 to display the list. In step S1506, the CPU 201 determines whether one function has been selected from among the functions. In a case where it is determined that one function has been selected (Yes in step S1506), the process proceeds to step S1507. In a case where it is determined that no function has been selected (No in step S1506), the process ends. In step S1507, the CPU 201 recognizes and stores the function selected on the displayed list in the RAM 203. In step S1508, the CPU 201 receives a request to display an option about whether to set authentication, and causes the operation unit 209 to display the option. In step S1509, the CPU 201 determines whether authentication is set. In a case where it is determined that the authentication is set (Yes in step S1509), the process proceeds to step S1510. In a case where it is not determined that the authentication is set (No in step S1509), the process proceeds to step S1511.

In step S1510, the CPU 201 stores in the HDD 204 the service, the function, and the setting of authentication which have been stored in the RAM 203. In step S1511, the CPU 201 acquires and stores all Intents services, which are to be managed, in the RAM 203. In step S1512, the CPU 201 checks whether the services and functions stored in the RAM 203 are included in all the Intents services acquired in step S1511. In a case where the services and functions stored in the RAM 203 are included (Yes in step S1512), the process proceeds to step S1513. In a case where the services and functions stored in the RAM 203 are not included (No in step S1512), the process ends. In step S1513, the CPU 201 updates the values of the included services and functions, which are identified by the Intents services acquired in step S1511, so as to represent no authentication.

Figure 13:
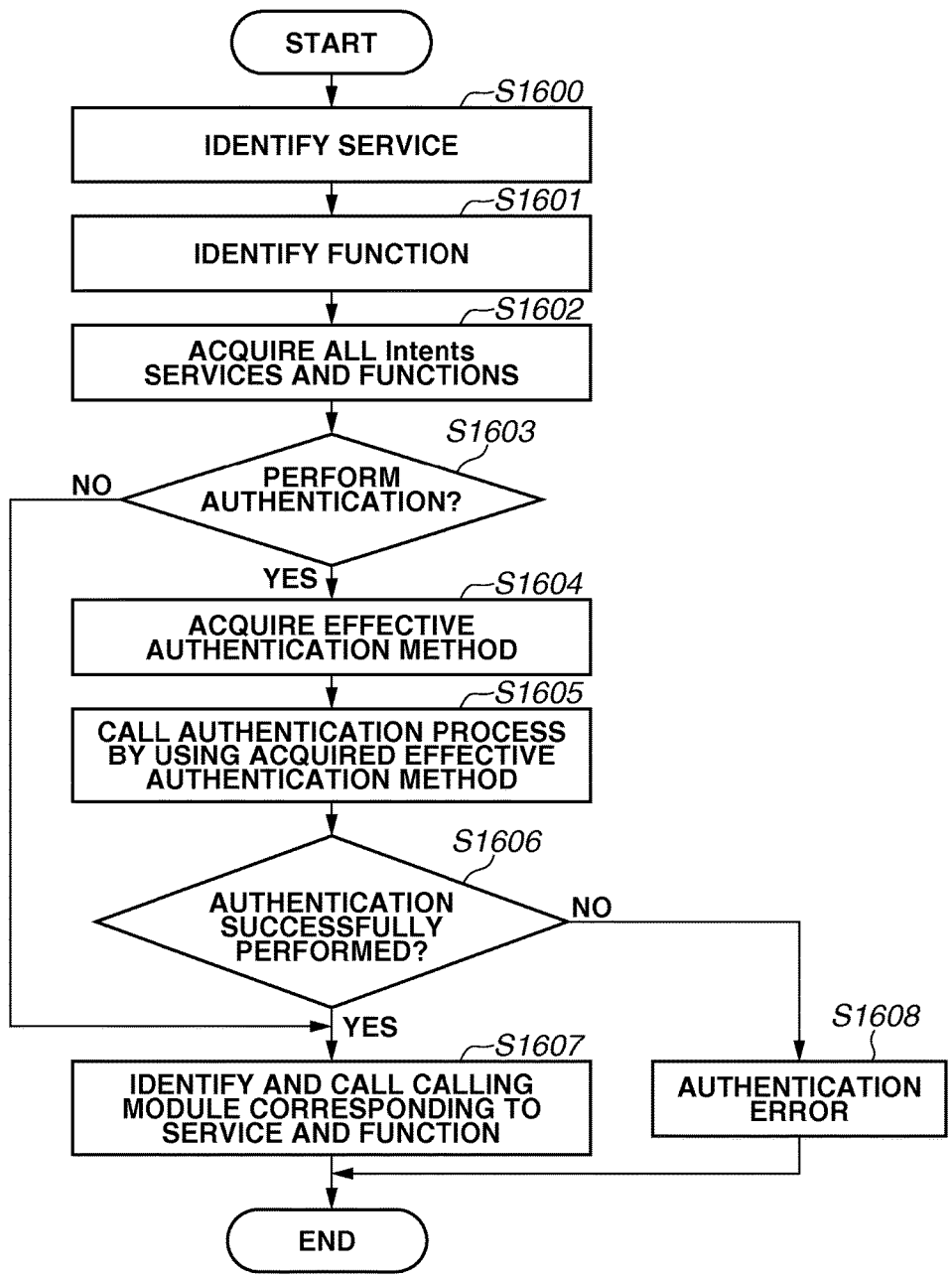
FIG. 13 is a flowchart illustrating a process of providing authentication for each of functions of an Intents service.

FIG. 13 is a flowchart illustrating a process of providing authentication by Web Intents service function. Operations illustrated in the flowchart of FIG. 13 are realized by the CPU 201 of the MFP 101 executing the control program.

In step S1600, the CPU 201 identifies an Intents service selected by a user on a menu screen (not illustrated) displayed by the web browser, and stores information on the identified Intents service in the RAM 203. In step S1601, the CPU 201 identifies one function from among a plurality of functions provided by the Intents service, and stores information on the identified function in the RAM 203. In step S1602, the CPU 201 acquires and stores in the RAM 203 information on Intents services and on functions from the HDD 204.

In step S1603, by comparing the identified service and the identified function with the services and the functions acquired in step S1602, the CPU 201 identifies a corresponding service and a corresponding function. The CPU 201 determines whether the corresponding service and the corresponding function are set to be authenticated. In a case where the corresponding service and the corresponding function are set to be authenticated (Yes in step S1603), the process proceeds to step S1604. In a case where the corresponding service and the corresponding function are not set to be authenticated (No in step S1603), the process proceeds to step S1607.

In step S1604, the CPU 201 acquires and stores an effectively set authentication method in the RAM 203. In step S1605, the CPU 201 calls an authentication process in the authentication method effectively set in step S1603. In step S1606, the CPU 201 determines whether the authentication has successfully been performed. In a case where the authentication has been successfully performed (Yes in step S1606), the process proceeds to step S1607. In a case where the authentication has not been successfully performed (No in step S1606), the process proceeds to step S1608.

In step S1607, the CPU 201 acquires a value of a module from the service and the function identified in step S1603, and starts the module. In step S1608, the CPU 201 notifies the web-browser application 309, which is a caller, of the authentication error.

With the process according to the second exemplary embodiment as described above, it is possible to set whether authentication is necessary for an Intents service and for each of a plurality of functions provided by the service. This makes it possible to switch whether authentication is necessary for each of the plurality of functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-171161, filed Aug. 26, 2014, which is hereby incorporated by reference herein in its entirety.

What is claimed is:

1. An information processing apparatus comprising:
a memory device that stores a set of instructions; and
at least one processor that executes the instructions to:
  display, on a display unit, an application selection screen;
  accept, via the application selection screen, an instruction to activate a web browser;
  execute an application selected in a web page displayed on the web browser;
  set, in accordance with a user operation input via the web browser, setting information indicating whether or not user authentication is required to execute an application which is selectable via the web browser, wherein the setting information is stored in a storage of the information processing apparatus;
  require an input of user information, in a case where an execution for the application is instructed via the web browser and the setting information indicates that the user authentication for executing an application selected via the web browser is required; and
  execute, based on an instruction via the web browser, the application selected via the web browser in a case where the user authentication based on the inputted user information succeeds,
  wherein in a case where the setting information indicating that user authentication is required to activate the web browser is set, the user authentication is required to be performed twice from a time when the web browser is activated via a menu screen to a time when the application is executed from the web page displayed on the web browser.

2. The information processing apparatus according to claim 1, wherein
the application is an application which is installed in the information processing apparatus.

3. A method for controlling an information processing apparatus comprising a memory device that stores a set of instructions and at least one processor, the method being executed by the at least one processor in accordance with the instructions and comprising processes of:
  displaying, on a display unit, an application selection screen;
  accepting, via the application selection screen, an instruction to activate a web browser;
  executing an application selected in a web page displayed on the web browser;
  setting, in accordance with a user operation input via the web browser, setting information indicating whether or not user authentication is required to execute an application which is selectable via the web browser, wherein the setting information is stored in a storage of the information processing apparatus;
  requiring an input of user information, in a case where an execution for the application is instructed via the web browser and the setting information indicates that the user authentication for executing the application selected via the web browser is required; and
  executing, based on an instruction via the web browser, the application selected via the web browser in a case where the user authentication based on the inputted user information succeeds,
  wherein in a case where the setting information indicating that user authentication is required to activate the web browser is set, the user authentication is required to be performed twice from a time when the web browser is activated via a menu screen to a time when the application is executed from the web page displayed on the web browser.

4. A non-transitory computer readable storage medium storing a program causing a computer comprising a storage unit that stores one or more applications to execute steps of:

displaying, on a display unit, an application selection screen;

accepting, via the application selection screen, an instruction to activate a web browser;

executing an application selected in a web page displayed on the web browser;

setting, in accordance with a user operation input via the web browser, setting information indicating whether or not user authentication is required to execute an application which is selectable via the web browser, wherein the setting information is stored in a storage of the information processing apparatus;

requiring an input of user information, in a case where an execution for the application is instructed via the web browser and the setting information indicates that the user authentication for executing an application selected via the web browser is required; and executing, based on an instruction via the web browser, the application selected via the web browser in a case where the user authentication based on the inputted user information succeeds, wherein in a case where the setting information indicating that user authentication is required to activate the web browser is set, the user authentication is required to be performed twice from a time when the web browser is activated via a menu screen to a time when the application is executed from the web page displayed on the web browser.

\* \* \* \* \*